3,036,887
PROCESS FOR THE PRODUCTION OF PEROXYMONOPHOSPHORIC ACID

Franz Beer and Josef Müller, Rheinfelden, Germany, assignors to Deutsche Gold- und Silber-Scheideanstalt vormals Roessler, Frankfurt am Main, Germany
No Drawing. Filed July 22, 1960, Ser. No. 44,561
Claims priority, application Germany July 23, 1959
3 Claims. (Cl. 23—165)

The present invention relates to a novel process for the production of peroxymonophosphoric acid.

The object of the present invention is to provide a more economical and technically feasible process for the production of peroxymonophosphoric acid.

The production of peroxymonophosphoric acid according to the equation $P_2O_5 + 2H_2O_2 + H_2O = 2H_3PO_5$ has already been described by Schmidlin and Massini (Ber., 43, 1910, page 1162). However, this reaction involving the mixing of ordinary phosphorous pentoxide and hydrogen peroxide entails a considerable safety risk because of the great quantities of heat that are evolved during this exothermic reaction.

In addition, a process for the production of peroxymonophosphoric acid is described in German Auslegeschrift 1,037,434, in which a less reactable form of phosphorous pentoxide is used in the above-mentioned reaction. However, the necessary thermal pretreatment of this form of the phosphorous pentoxide as well as the corresponding long reaction times involved with its use with hydrogen peroxide make this process cumbersome to operate and time consuming. Moreover, the yields obtained by this process are not very good.

It has now been found according to the present invention that peroxymonophosphoric acid or mixtures containing this compound can be produced in a much more technically feasible manner than has been hitherto possible, if phosphoric acid is used as a diluent for the reaction. Thus, it has been found that if hydrogen peroxide alone is added to or if phosphorous pentoxide and hydrogen peroxide are simultaneously or intermittently blended into a "previously prepared mixture" of phosphoric acid and phosphorous pentoxide, then peroxymonophosphoric acid is formed in such a manner that the reaction temperature does not rise so high that the reaction cannot be readily regulated. Furthermore, in a modified form of this unique process, it is also possible to use the reaction product of phosphorous pentoxide, hydrogen peroxide and water as the "previously prepared mixture" since this particular mixture essentially consists of peroxymonophosphoric acid admixed with small quantities of perphosphoric acid and hydrogen peroxide. In all the reactions, according to the present invention, it is now possible to maintain the reaction temperature so low that the exothermic reaction heat can be easily controlled.

When both phosphorous pentoxide and hydrogen peroxide are to be blended into one of the "previously prepared mixtures" described above, care must be taken to insure that these two materials do not come into direct contact with one another in undiluted form. To avoid this undesirable possibility it is preferable to so proceed that the addition of these two compounds is made on an intermittent basis, that is, by the addition of all or portions of one and then the addition of all or portions of the other, with thorough admixing between additions, or by adding the two materials at the same time but at different places in the reaction system with adequate stirring to insure contact of, at best, only dilute strength materials. In each case care must be taken, by the use of a good, thorough blending operation, that the temperature does not rise too high.

It has also been found according to the invention that the best yields are obtained if the mol proportions of phosphorous pentoxide, hydrogen peroxide and water used, amount to about 1:2:1. However, these quantities are not critical. If necessary, good yields can also be obtained if, in particular, the quantities of water used are higher than those indicated by the above mol ratio, e.g. mol proportions from 1:1:1 to 6 to 1:2.5:0.5 to 6 can also be used. For practical purposes it is also possible to proceed in such a fashion that technical grade phosphorous pentoxide and an aqueous, concentrated, preferably 80% by weight, solution of hydrogen peroxide are the forms of these reagents added to the "previously prepared mixtures." When using these materials in such forms the mol ratio proportions of phosphorous pentoxide, hydrogen peroxide and water to be used correspond approximately to the mol ratio formula given above.

In order to avoid decomposition it is expedient that the reaction be conducted at a temperature of about 10 to 50° C. and preferably at 30 to 35° C. At higher temperatures a considerable loss of active oxygen occurs. On the other hand, if the reaction is conducted at temperatures lower than those listed above the reaction will take too long to be considered technically feasible. In addition, at such low temperatures the resulting higher viscosity of the mixtures makes a thorough blending of the reactants very difficult.

The duration of the reaction depends upon the temperature of the reaction system. For example, a reaction period of about two hours is sufficient at a reaction temperature of 30 to 35° C. in order to have the reaction proceed practically to completion.

In many cases it is expedient to remove the unreacted free hydrogen peroxide from the reaction mixture at the termination of the reaction period. To this end the hydrogen peroxide can be distilled off at reduced pressure and at a temperature which does not rise above 50° C.

After the desired reaction period has elapsed and the unreacted hydrogen peroxide, if any, has been removed, the reaction mixture can be diluted with water while being cooled, preferably at temperatures under 25° C. The undiluted reaction mixture as well as the diluted, aqueous solution of it are unexpectedly stable.

The peroxymonophosphoric acid or mixtures containing it produced by the process of this invention can be used as is or in the form of its salts with good results for the bleaching of fibers, textile goods and other materials commonly bleached with this type bleaching agent.

The following examples are merely illustrative of the present invention and are not intended as a limitation thereon.

Example 1

24.2 parts by weight of phosphorous pentoxide were blended into 21.6 parts by weight of 85% by weight phosphoric acid. After removing the exothermic heat of reaction to the point where the mixture had a temperature of 30° C., 15.3 parts by weight of 95.3% by weight $H_2O_2$ were slowly fed into this mixture with good stirring and a continued moderate cooling whereby the reaction mixture was maintained during the admixing at a temperature of 34° C. After standing at room temperature for 15 hours the reaction product contained a total active oxygen content of 90.3%, based on the amount of active oxygen charged into the system, of which 32.7% was present as $H_2O_2$ and 57.6% as peroxymonophosphoric acid. The mol ratios of phosphorous pentoxide, $H_2O_2$ and water used were 1:1.625:1.9.

Example 2

7 parts by weight of phosphorous pentoxide were first blended into 10 parts by weight of 85% by weight phosphoric acid under such cooling and stirring conditions that the reaction temperature was maintained at about 30° C. Then 17.1 parts by weight of phosphorous pentoxide were simultaneously introduced into this mixture with 7.68 parts by weight of 94.6% by weight $H_2O_2$, each of these latter two quantities being added in small portions and thoroughly blended into the mixture. After standing two hours at 22° C., the active oxygen content of the reaction mixture amounted to 94.6% of the amount of active oxygen originally charged into the system of which 63.5% was in the form of peroxymonophosphoric acid, 28.8% as $H_2O_2$ and 2.3% as peroxydiphosphoric acid. The mol ratios of phosphorous pentoxide, $H_2O_2$ and water used were 1:1:1.11.

*Example 3*

15.3 parts by weight of 95.3% $H_2O_2$ were thoroughly stirred into a mixture of 24.13 parts by weight of phosphorous pentoxide and 10 parts by weight of 85% by weight phosphoric acid at a temperature of 30° C. The reaction mixture was then allowed to stand at 20° C. for 5 hours. The active oxygen yield amounted to 94% of the amount of active oxygen originally charged into the system of which 21.41% was present as $H_2O_2$, 1.38% as peroxydiphosphoric acid and 71.2% as peroxymonophosphoric acid. The mol ratios of phosphorous pentoxide, $H_2O_2$ and water used were 1:2.01:1.19.

*Example 4*

71 parts by weight of phosphorous pentoxide and 40.8 parts by weight of 83.4% by weight $H_2O_2$ were introduced over a period of 25 minutes with stirring and under cooling to 20° C. into 50.56 parts by weight of a mixture which contained 5.13 g. of active oxygen as peroxymonophosphoric acid, 0.71 g. of active oxygen as $H_2O_2$ and 0.15 g. of active oxygen as peroxydiphosphoric acid. After the termination of the admixing procedure the entire reaction mixture was allowed to stand at 20° C. for six hours longer. After this time the reaction mixture contained 79.1% of the originally charged active oxygen in the form of peroxymonophosphoric acid, in addition to 8.6% as $H_2O_2$ and 4.39% as peroxydiphosphoric acid. Consequently, the total active oxygen yield amounted to 92.1%. The mol ratios of phosphorous pentoxide, $H_2O_2$ and water that were used were 1:2:0.754.

*Example 5*

71 parts by weight of phosphorous pentoxide and 40.8 parts by weight of 83.4% by weight $H_2O_2$ were introduced over a period of 25 minutes with stirring and under cooling to 30° C. into 51 parts by weight of a mixture which contained 5.2 g. of active oxygen as peroxymonophosphoric acid, 0.73 g. of active oxygen as $H_2O_2$ and 0.11 g. of active oxygen as peroxydiphosphoric acid. After the termination of the admixing procedure the entire reaction system was allowed to stand for two hours longer at 30° C. After this time the reaction mixture contained 78.8% of the originally charged active oxygen as peroxymonophosphoric acid in addition to 8.1% as $H_2O_2$ and 3.2% as peroxydiphosphoric acid. The total active oxygen yield amounted therefore to 90.1%. The mol ratios of phosphorous pentoxide, $H_2O_2$ and water that were used were 1:2:0.754.

The $H_2O_2$ was distilled off from the various reaction mixtures obtained in Examples 1 to 5 in a vacuum at a temperature below 50° C. and the residues were diluted with water under cooling to a maximum temperature of 25° C. for storage and utility purposes.

We claim:

1. In a process for the production of peroxymonophosphoric acid by reacting aqueous hydrogen peroxide with phosphorus pentoxide, the step which comprises supplying the phosphorus pentoxide and hydrogen peroxide separately into a previously prepared reaction medium selected from the group consisting of (1) a mixture of phosphoric acid with a minor proportion of phosphorus pentoxide and (2) a mixture of peroxymonophosphoric acid with small quantities of peroxydiphosphoric acid and hydrogen peroxide while maintaining a temperature between 10 and 50° C. in such reaction medium and preventing direct contact of the phosphorus pentoxide and hydrogen peroxide supplied before dilution with the reaction medium.

2. A process as in claim 1 in which said temperature is 30 to 35° C.

3. A process as in claim 1 in which the mol ratios of all the phosphorous pentoxide, hydrogen peroxide and water used are approximately 1:2:1.

References Cited in the file of this patent

UNITED STATES PATENTS 2,765,216     Heiderich     Oct. 2, 1956